Nov. 7, 1933.  O. W. HOLMES  1,933,554
CONVEYER FOR SELF SERVING RESTAURANTS
Filed Oct. 12, 1931
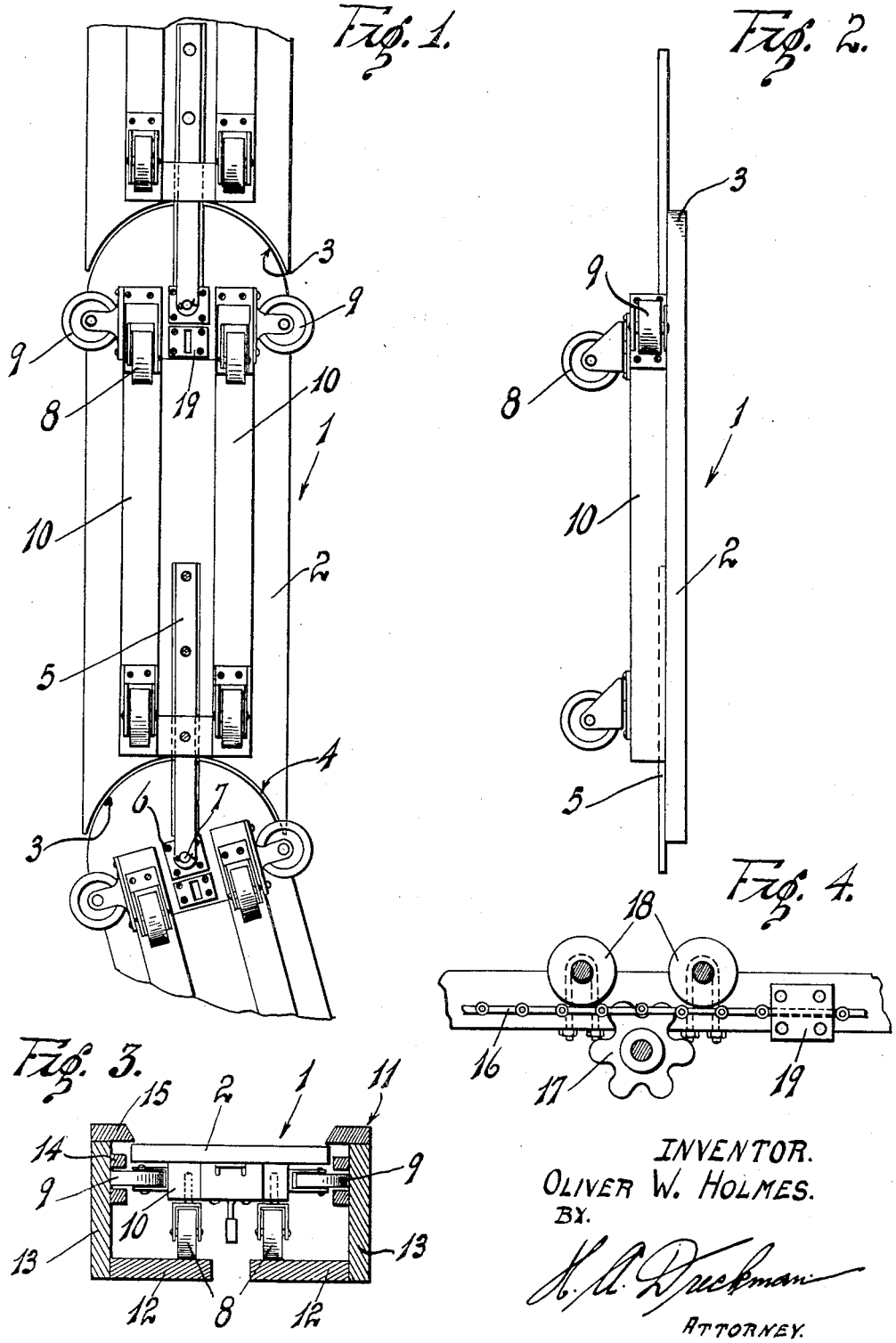
INVENTOR.
OLIVER W. HOLMES.
BY.
ATTORNEY.

Patented Nov. 7, 1933

1,933,554

UNITED STATES PATENT OFFICE 1,933,554

CONVEYER FOR SELF SERVING RESTAURANTS

Oliver W. Holmes, Long Beach, Calif.

Application October 12, 1931. Serial No. 568,329

1 Claim. (Cl. 198—181)

This invention relates to a conveyer for self serving restaurants.

The prime object of my invention is to provide a conveyer which is adapted to move in an elliptical path.

Another object is to provide a conveyer comprising a plurality of carriages. These carriages being so connected and fitted that there is no appreciable space between them through which the articles may fall.

Still another object is to provide a conveyer of the character stated, which moves with a minimum of frictional resistance and which travels in a housing, the edges of which housing are so arranged that articles on the conveyer will not fall off.

Other objects, advantages and features of invention may appear from the accompanying drawing, the subjoined detailed description and the appended claim.

In the drawing.

Figure 1 is a bottom plan view of a carriage. Fragments of adjacent carriages being shown.

Figure 2 is a side elevation of the carriage.

Figure 3 is a transverse sectional view of the housing or track with the carriage in position.

Figure 4 is a transverse sectional view of a driving arrangement.

Referring more particularly to the drawing, the numeral 1 indicates a carriage, a plurality of which when joined end to end formed a conveyer particularly applicable to self serving restaurants and the like. It is very advantageous to provide a conveyer which can move in an elliptical path so that space fronting on the street can be conserved when the conveyer is used in a restaurant.

My conveyer comprises a top board or plate 2 one end of which is cut in a convex circular shape as shown at 3, and the other end is cut in a concave circular shape as shown at 4. The ends 3, 4 fit together as shown in Figure 1 so as the conveyer moves in a circle no space is opened between the carriage through which small articles might fall.

A strap 5 is secured to one carriage and extends beyond the end thereof. The plate 6 is secure to the adjacent carriage and a pivot pin 7 projects from the plate through the strap 5, thus pivotally attaching the carriages together.

A plurality of castors 8 are attached to the bottom of the carriage 1 and these castors are journaled in the carriage so that they may move as the carriage moves in an arc. The castors are preferably rubber tired so as to eliminate noise.

A pair of guide rollers 9—9 are mounted adjacent one end of each of the carriages and these guide rollers engage the side walls of the housing or track in which the conveyer moves. The purpose is to hold the conveyer central in the track. The rollers 9—9 are arranged horizontally substantially as shown. The castors 8 and rollers 9—9 are preferably attached to blocks 10—10 which are secured to and depend from the top plate 2.

The track or runway 11 consists of bottom members 12 which support the carriages and upon which the castors 8 travel. Side walls 13—13 rise from the bottom members 12—12. A pair of spaced guide strips 14 are provided on each of the walls 13—13. These strips are positioned above and below the guide rollers 9 and form a track in which these guide rollers move.

A finishing strip 15 is mounted on top of each of the walls 13—13 and this strip extends inwardly and slightly over the side edges of the carriages 1. These finishing strips furnish the purpose of hiding the mechanism on each of the carriages and also they prevent any articles from falling off of the top of the carriage into the housing 11.

The conveyer is continuously driven by any suitable means, such as a rack attached to each of the carriages, or by means of a chain 16 attached to each carriage. The chain meshes with a sprocket wheel 17 which is driven from a suitable source of power not shown. A pair of idlers 18 engage the chain and hold it in engagement with the sprocket. The chain is preferably attached to the top plate 2 of the carriages by means of a clip 19 or any other suitable method may be employed.

Having described my invention, I claim:

A conveyer for self serving restaurants comprising a plurality of carriages, each carriage including a top plate, one end of said top plate being cut convexly and the other end concavely, the convex end of one carriage fitting into the concave end of the other carriage, means pivotally connecting adjacent carriages together, a plurality of rollers on each carriage, a continuous conveyer housing comprising a bottom member on which said rollers rest, side walls, a finishing strip on the top of side walls, said finishing strip extending over the edge of the top plate whereby articles are prevented from falling off of the conveyer, a pair of horizontally positioned guide rollers adjacent one end of the carriages, and a pair of guide strips in the housing between which said guide rollers travel.

OLIVER W. HOLMES.